United States Patent
Korpela et al.

(10) Patent No.: US 6,510,146 B1
(45) Date of Patent: Jan. 21, 2003

(54) METHOD FOR HANDOVER AND CELL RE-SELECTION

(75) Inventors: Mikko Korpela, Raahe; Sami Jutila; Arto Pussinen, both of Oulu, all of (FI); Kari Pirttikangas, Farnborough (GB); Raino Lintulampi, Kiviniemi (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/103,273

(22) Filed: Jun. 23, 1998

(30) Foreign Application Priority Data

Jun. 25, 1997 (FI) .................................. 972736

(51) Int. Cl.$^7$ ................................................ H04Q 7/00
(52) U.S. Cl. ...................................... 370/332; 455/436
(58) Field of Search ................................ 370/328, 329, 370/331, 332, 343, 480; 455/436, 437, 438, 442, 443, 444, 507, 515, 517

(56) References Cited

U.S. PATENT DOCUMENTS

| | | | |
|---|---|---|---|
| 5,345,448 A | 9/1994 | Keskitalo | 370/95.3 |
| 5,396,653 A | 3/1995 | Kivari et al. | 455/88 |
| 5,410,733 A | 4/1995 | Niva et al. | 455/432 |
| 5,430,740 A | 7/1995 | Kivari et al. | 371/37.1 |
| 5,483,668 A | 1/1996 | Malkamaki et al. | 455/33.2 |
| 5,524,009 A | 6/1996 | Tuutijarvi et al. | 370/95.3 |
| 5,570,353 A | 10/1996 | Keskitalo et al. | 370/18 |
| 5,577,024 A | 11/1996 | Malkamaki et al. | 370/18 |
| 5,606,548 A | 2/1997 | Vayrynen et al. | 370/252 |
| 5,659,536 A | 8/1997 | Byrne et al. | 455/436 |
| 5,708,656 A | 1/1998 | Noneman et al. | 370/320 |
| 5,710,974 A | 1/1998 | Granlund et al. | 455/33.2 |
| 5,724,665 A | 3/1998 | Abbasi et al. | 455/561 |
| 5,726,981 A | 3/1998 | Ylitervo et al. | 370/332 |
| 5,745,503 A | 4/1998 | Kuusinen | 371/37.1 |
| 5,764,632 A | 6/1998 | Ylitervo | 370/337 |
| 5,774,809 A | 6/1998 | Tuutijarvi et al. | 455/437 |
| 5,903,840 A | * 5/1999 | Bertacchi | 455/436 |
| 6,161,013 A | * 12/2000 | Anderson et al. | 455/435 |

FOREIGN PATENT DOCUMENTS

| | | |
|---|---|---|
| WO | WO 94/07322 | 3/1994 |
| WO | WO 98/24194 | 6/1998 |

OTHER PUBLICATIONS

Finnish Official Action.

* cited by examiner

Primary Examiner—Melvin Marcelo
Assistant Examiner—D. Trinh
(74) Attorney, Agent, or Firm—Perman & Green, LLP (57) ABSTRACT

For transmitting information about the neighbouring cells to mobile stations, a base station of a cellular radio system creates a message (27, 27') containing information about the neighbouring cells and transmits it to the mobile station. In addition to the transmission frequencies used in the neighbouring cells, the base station includes in the message other information characterizing the neighbouring cells (32a, 32b, 32c, 34). In particular, the base station includes in the message information about the quality of service offered to mobile stations by each of the neighbouring cells mentioned in the message. On the basis of the message, the mobile station makes a preliminary selection of a group of the most advantageous new cells and performs measurements among this preliminary selection in order to find a suitable new cell (41, 47). If the measurements show that there is at least one suitable new cell among the preliminary selection, the mobile station selects a new cell from this group (42). If the measurements show that there are no suitable new cells in this group, the mobile station selects a new cell from another group of cells than the preliminary selection (43, 48).

10 Claims, 5 Drawing Sheets

METHOD FOR HANDOVER AND CELL RE-SELECTION

TECHNICAL FIELD

The invention relates to the selection of a cell carried out by the mobile station of a cellular radio system in general. In particular, the invention relates to the selection of a cell in a situation where there are cells with different qualities of service available.

DESCRIPTION OF PRIOR ART

A mobile station of a cellular radio system always tends to select a certain base station in the cell of which it operates or camps. Traditionally, the selection of a cell was based on the measurement of the strength of the received radio signal, either in the mobile station or the base station. In the GSM system (Global System for Mobile Telecommunications), for instance, each base station transmits a signal in a certain so-called BCCH channel (Broadcast Control Channel), the frequency of which is different at neighbouring base stations, and the mobile stations measure the strengths of the BCCH signals received and determine on the basis of the strength which cell is the most advantageous with regard to the quality of the radio connection. The base stations also transmit information about the BCCH frequencies used in neighbouring cells to the mobile stations so that they know which frequencies they must listen to in order to find the BCCH transmissions of neighbouring cells. In each cell, the transmission of the BCCH channel also contains information of how the mobile stations can make so-called random access requests in the cell for establishing a telephone connection.

The prior art arrangement is very suitable for the digital cellular radio systems of the second generation, such as GSM and its extension DCS1800 (Digital Communications System at 1800 MHz, IS-54 (Interim Standard 54) and PDC (Personal Digital Cellular). However, it has been suggested that in the digital cellular systems of the third generation in the future, the quality of service offered by the cells to the mobile stations varies substantially from cell to cell. Suggestions for systems of the third generation are UMTS (Universal Mobile Telecommunications System) and FPLMTS/IMT-2000 (Future Public Land Mobile Telecommunications System/International Mobile Telecommunications at 2000 MHz). In these plans, the cells are divided according to size and properties into pico-, nano-, micro- and macrocells, for example, and the data transfer speed can be used as an example of the quality of service. The picocells have the highest data transfer speed, and the macrocells have the lowest. The cells can be partly or entirely overlapping, and there can be different kinds of mobile stations, whereby all mobile stations may not be able to use the quality of service offered by all the cells.

Figure 1:
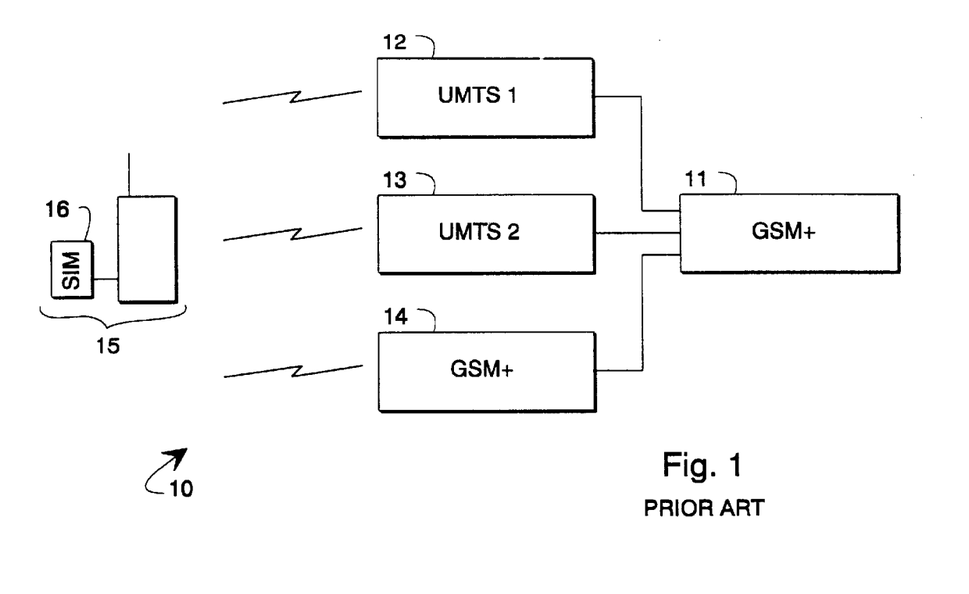
FIG. 1 shows a cellular radio system, which is likely to be developed in the future.

FIG. 1 shows a likely future form of a cellular radio system, which is not entirely new as compared to the GSM, but which contains both known parts and entirely new parts. The bottleneck of the present cellular radio systems, which impedes offering more developed services to mobile stations, is the radio access network formed by the base stations. The core network of the cellular radio system, which consists of Mobile services Switching Centres (MSC), other network elements (in GSM, for instance, the SGSN and GGSN related to the packet switched radio systems, which mean Serving GPRS Support Node and Gateway GPRS Support Node, where GPRS means General Packet Radio Service) and transmission systems related to them, is capable, at least as conforming to the GSM Phase 2+ specifications, which are a further development of GSM, of transmitting the new kinds of services. In FIG. 1, the core network of the cellular radio system 10 is the GSM Phase 2+ core network 11, with three parallel radio access networks connected to it. Of these, the networks 12 and 13 are UMTS radio access networks and the network 14 is a GSM Phase 2+ radio access network. Of the UMTS radio access networks, the upper 12 in the figure is a general radio access network, which is owned by a teleoperator offering mobile station services and which serves equally all the customers who have a subscription with the teleoperator. The lower UMTS radio access network 13 is private, and its owner is, for instance, a large company in the premises of which the radio access network operates. The cells of the private radio access network 13 are typically nano- and/or picocells, and only the mobile stations of the company's employees can operate in them. The cells of all the three radio access networks 12, 13 and 14 can be entirely or partly overlapping.

The mobile station 15 shown in FIG. 1 is preferably a so-called dual-mode mobile station, which can operate either as a GSM mobile station of the second generation or as a UMTS mobile station of the third generation, depending on what kind of services there are available in its location at the time and what the data transfer needs of the user are. It can also be a multi-mode mobile station, which can operate in many different data transfer systems according to the need and availability of services. A SIM unit 16 (Subscriber Identity Module) connected to the mobile station is also shown separately in the figure.

The application of the prior art arrangement to a digital cellular system of the planned third generation would mean that each base station would broadcast a transmission like the BCCH channel, which would include, in addition to other information, information of the BCCH frequencies of neighbouring and/or overlapping other cells. Because in the known systems each base station also expresses information of itself in its own BCCH signal for implementing the connection requests, an apparent solution would be adding to the own BCCH transmission of the third generation base station information of what quality of service the base station offers and to which class of size its cell belongs. However, an arrangement like this loads the mobile stations, because a mobile station operating in a certain cell must at first read from the BCCH signal transmitted by the base station of its cell a list of other BCCH frequencies, and thereafter receive, demodulate and decode a short period of each BCCH transmission coming at a frequency included in the list in order to find out if the mobile station can operate in the neighbouring cells in question. It can happen that a considerable part of the neighbouring cells are 2 Mbit/s picocells, but the mobile station can only operate at a data transfer speed of 64 kbit/s in macrocells, in which case it would not be worthwhile to waste time and electric power for receiving the BCCH transmissions of the picocells (it is even possible that the slow 64 kbit/s mobile stations cannot operate at all in the fast picocells; alternatively a slow mobile station can operate in a fast picocell only if there are no other cells available). Similarly, it can happen that a fast UMTS mobile station operating temporarily in a 64 kbit/s macrocell would want to establish a fast 2 Mbit/s data transfer connection, whereby it must change to one of the picocells available. If the quality of service of most of the neighbouring cells is too low for this, the reception, demodulation and decoding of their BCCH transmissions in order to find a new cell is wasted.

SUMMARY OF THE INVENTION

It is an objective of this invention is to present a method and a system in which the use of data transfer resources for finding a suitable new cell is more efficient than in the prior art solutions.

The method according to the invention, in which method the base station creates a message containing information about the neighbouring cells and transmits it to the mobile station, is characterized in that in addition to the transmission frequencies used in the neighbouring cells, the message of the base station also contains other information characterizing the neighbouring cells. In the second embodiment of the method according to the invention, it is characterized in that it comprises steps in which a) the base station transmits to the mobile station a message which contains information describing the neighbouring cells near the base station, b) on the basis of the message, the mobile station makes a preliminary selection of a group of the most advantageous new cells, and c) the mobile station performs measurements among the preliminary selection of cells in order to find a suitable new cell, whereby if the measurements show that the preliminary selection of cells contains at least one suitable new cell, the mobile station selects the new cell from among the preliminary selection of cells, and if the measurements show that the preliminary selection of cells does not contain any suitable new cell, the mobile station selects the new cell from among other cells than those included in the preliminary selection.

The invention also relates to the base station and mobile station of the cellular radio system. The base station according to the invention is characterized in that it comprises information of a group of neighbouring cells near the cell of the base station in question, containing information of the transmission frequency used in the neighbouring cells and of the quality of service offered by the neighbouring cells to mobile stations, and it is equipped to create of this information a message describing the neighbouring cells and to transmit the message to mobile stations. A mobile station according to the invention is characterized in that it is equipped to express information about the quality of service of the cells from the messages transmitted by the base station of the cell selected at the moment, and to focus the measurements primarily on the neighbouring cells of the cell selected at the moment, which according to the information expressed correspond to the quality of service required by the mobile station.

The invention also relates to a cellular radio system, which comprises base stations cells related to them and mobile stations, and in which the base stations are equipped to create and transmit messages to the mobile stations, and the mobile stations are equipped to expect a certain maximum quality of service from the cell, to receive messages from the base stations and to perform measurements of the cells in order to find a suitable cell for a new selection. It is characterized in that it comprises in at least one base station information about a group of neighbouring cells near the cell of the base station in question, including information about the transmission frequency used in the neighbouring cells and about the quality of service offered to mobile stations by the neighbouring cells, whereby the base station is equipped to create of this information a message describing the neighbouring cells and to transmit this message to the mobile stations.

The operation of the mobile stations for finding a suitable new cell can be directed more efficiently than in the prior art solutions, if the mobile station knows the quality of service offered by other base stations in advance In the arrangement according to the invention, the base station transmits information about the quality of service of the base stations of the neighbouring cells, whereby in order to find a new cell, the mobile station receives, demodulates and decodes the transmissions of only those neighbouring cells in which the transmitted signal has a sufficient power level, and which on the basis of the information transmitted by the present base station have a suitable quality of service. According to need, the base station maintains lists of those surrounding base stations to a cell of which it can change in the near future. The number and mutual order of base stations in the lists maintained by the mobile station is determined by the capability of the mobile station to utilize the services offered by the surrounding base stations.

BRIEF DESCRIPTION OF THE DRAWINGS

In the following, the invention will be described in more detail with reference to the preferred embodiments presented by way of example and the appended drawings, in which.

In the above description of the prior art, reference was made to FIG. 1, and therefore in the following description of the invention and its preferred embodiments, reference will be made mostly to FIGS. 2–5b. In the figures, the same reference numbers will be used for corresponding parts.

DETAILED DESCRIPTION OF THE INVENTION

Figure 2:
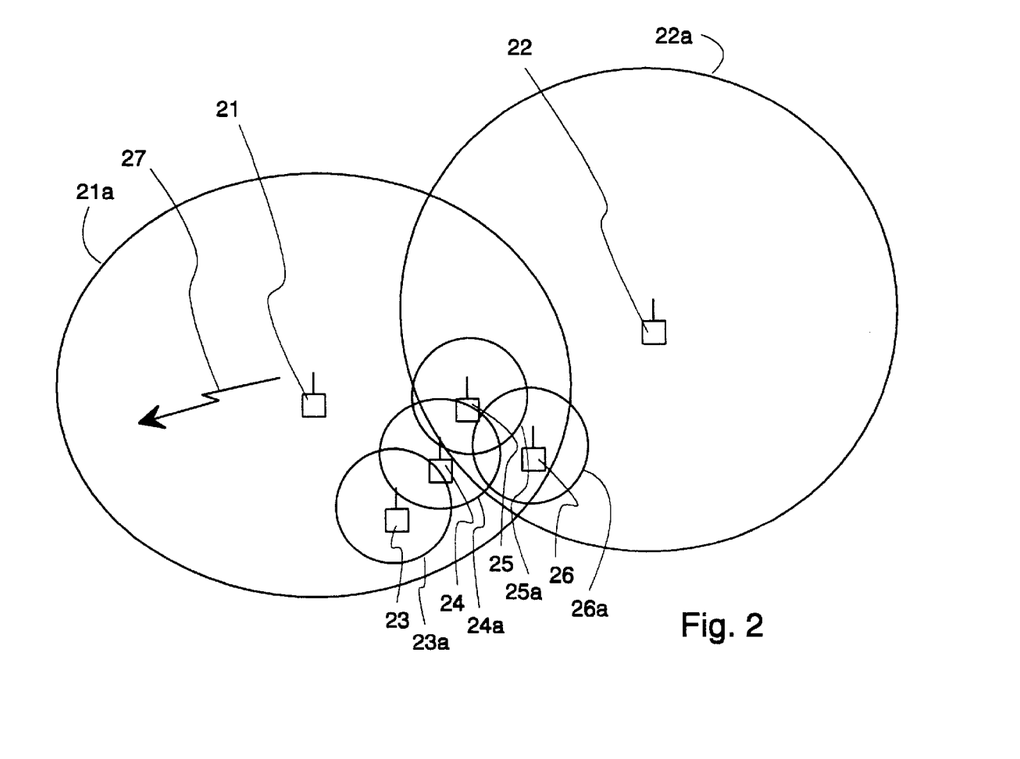
FIG. 2 shows a cellular radio system to which the invention can be applied.
Figure 3A:
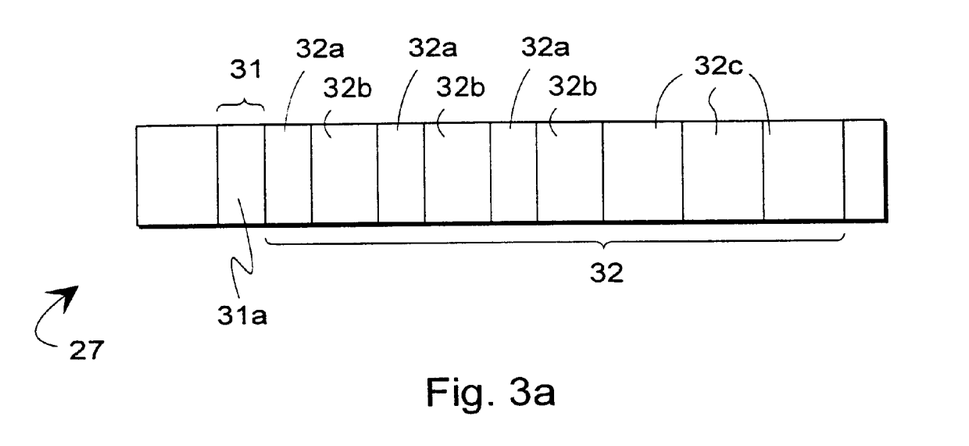
FIG. 3a shows a form of the system information message according to the invention.
Figure 3B:
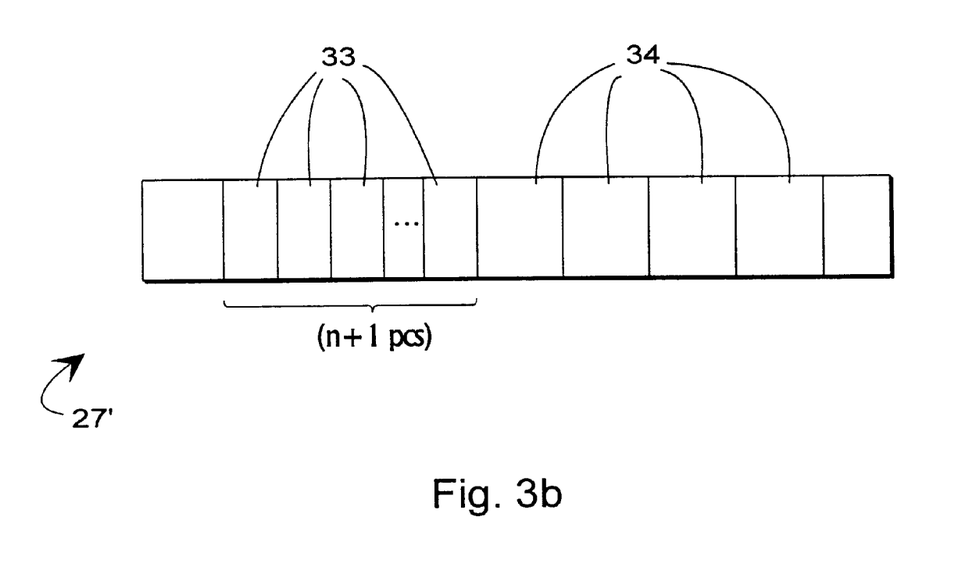
FIG. 3b shows another form of the system information message according to the invention.

For the implementation of the present inventive idea, certain action is required from both the base stations and the mobile stations. In the following, the operation of the base stations is examined at first. FIG. 2 is a schematical presentation of one part of a cellular radio system, in which the cells 21a, 22a, 23a, 24a, 25a and 26a of the base stations 21, 22, 23, 24, 25 and 26 are partly or entirely overlapping. For the sake of clarity, the data transfer connections from the base stations towards the network are not shown in the figure. The cells 21a and 22a are macrocells of the second generation system, and the cells 23a, 24a, 25a and 26a are picocells, which form a UMTS radio access network. Each base station transmits regularly at a certain frequency a so-called System Information Message, of which only the message 27 transmitted by the base station 21 is shown in FIG. 2 for clarity. The term "system information message" is here meant to be illustrative and not restrictive; the same information can be included in a message known by any name. The system information message includes some mandatory data elements, which are called L3 message information elements in the GSM system and probably also in the UMTS system and the final number and quality of which are formed in the standardization work concerning the systems of the third generation. According to the present invention, at least part of the system information messages also comprise so-called Neighbouring Cell Information Elements, which are described in more detail with reference to drawings 3a and 3b.

FIG. 3a shows one possibility of including the information elements concerning the neighbouring cells into the system information message 27. Here it is assumed that the cells have been divided according to the quality of service offered by them into capacity classes, which are numbered from zero to seven. The cells that offer the lowest quality of service belong to the capacity class 0, and the cells that offer the highest quality of service belong to the capacity class 7. The portion of the system information message concerning the neighbouring cells is divided into the fixed part 31 and the variable length part 32. The fixed part includes the field 31a, which tells into how many capacity classes the cells which the variable length part concerns are divided. The variable length part 32 presents the neighbouring cells by capacity classes. For each capacity class included in the system information message, the variable length part 32 has a first field 32a, which indicates which capacity class (0–7) is concerned, and a second field 32b, which indicates the length of the third field 32c describing the capacity class. The length of the third field can be given as the number of octets, for example. The third fields are in sequence by capacity class at the end of the variable length part 32, after the first and second fields concerning all the capacity classes.

For defining the lengths of the fields, it is advantageous to try to achieve compatibility with the specifications concerning systems of the second generation and previously presented plans concerning systems of the third generation. For instance, it can be decided that the neighbouring GSM cells are counted in the 0-capacity class and described by a field with a total length of sixteen octets in the same way as in the present GSM specifications. If there are GPRS cells (General Packet Radio Service) belonging to the 1-capacity class in the neighbouring cells, they can be described by absolute ARFCN values (Absolute Radio Frequency Channel Number), for which two octets per each carrier frequency are needed. According to the quality of service offered, the UMTS cells can be divided into the capacity classes 2–7, and at least two octets per each cell are needed to describe them (for the ARFCN value), but depending on the amount of information to be transmitted, as much as eight octets per cell may be needed for the description.

A specification according to FIG. 3a enables defining new capacity classes in the future. If the mobile station does not recognize a capacity class, it simply ignores the information concerning the capacity class in question. In the future, the classification of cells can be based on many other properties than merely the size and highest possible data transfer speed of the cell. In addition to the above, the system information message can also contain other information.

As an example we can take a system information message in which the base station notifies that there are some GSM or DCS1800 cells of the 0-capacity class, three GPRS cells and five UMTS-TDD (Time Division Duplex) pico-cells of the 7-capacity class in its neighbourhood. It can be assumed that eight octets are used to describe one UMTS-TDD picocell. Then the part of the system information message concerning the neighbouring cells is as shown in the following table. In the table, the numbers in the contents column are shown as decimal numbers for clarity; in the real message the numbers are naturally in binary form.

TABLE 1

| Field | Length | Contents | Notes |
|---|---|---|---|
| 31a | 3 bits | 3 | cells of three classes in the neighbourhood |
| 32a | 3 bits | 0 | class 0 = GSM |
| 32b | 6 bits | 16 | GSM cells are described by 16 octets in all |
| 32a | 3 bits | 1 | class 1 = GPRS |
| 32b | 6 bits | 6 | 3 GPRS cells are described by 6 octets in all |
| 32a | 3 bits | 7 | class 7 = UMTS TDD |
| 32b | 6 bits | 40 | 5 UMTS TDD cells are described by 40 octets in all |
| 32c | 16 octets | [class 0 data] | |
| 32c | 6 octets | [class 1 data] | |
| 32c | 40 octets | [class 7 data] | |

In consecutive system information messages transmitted by the base station, the parts describing the neighbouring cells need not be alike, but the base station can describe different neighbouring cells in different messages. When each message need not contain information of all neighbouring cells, the average length of the messages becomes shorter. Especially when a mobile station has an active telephone or data transfer connection with the base station, the base station can send shortened system information messages to it in a dedicated control channel. This procedure will be described in more detail later.

FIG. 3b shows another alternative for arranging the part of the system information message that describes the neighbouring cells. At the beginning of the system information message 27', there must be at least a parameter indicating the type of the message, which parameter is not separately shown in FIG. 3b (there must be a similar parameter at the beginning of a message according to FIG. 3a). The number of bits reserved for the parameter depends on how many different system information messages a redefined in the system; the more different messages, the longer parameters are needed for a unique identification of different types of messages. After this, there follow n+1 fields 33, half an octet long, each field indicating the number of the neighbouring cells described in the message, which belong to a certain capacity class 0-n. In other words, the first field 33 indicates the number of neighbouring cells belonging to the capacity class 0, described in the message, the second field indicates the number of neighbouring cells belonging to the capacity class 1, etc. After the fields 33 indicating the number, there is a field 34 in the message for each neighbouring cell described in the message. Field 34 shows a description of a neighbouring cell, two octets long, for instance. The description of the neighbouring cell comprises the required frequency information as a ARFCN value and possibly a LAC (Location Area Code) or other identifier, which indicates to which larger entity the cell belongs. The length of the field 34 can also be something else than two octets. It is particularly advantageous to leave free bits in the field specification for future extensions, and so three or four octets might be a suitable length for the field 34.

If it is assumed that two octets are used to describe each neighbouring cell, in a situation like the example described above in connection with FIG. 3a and Table 1, the part of the system information message describing the neighbouring cells, built according to the principle of FIG. 3b would be the following (it is also assumed that there are exactly two GSM cells in the neighbourhood):

TABLE 2

| Field | Length | Contents | Notes |
|---|---|---|---|
| 33 | 1/2 octets | 2 | two 0-class cells in the neighbourhood |
| 33 | 1/2 octets | 3 | three 1-class cells in the neighbourhood |
| 33 | 1/2 octets | 0 | zero 2-class cells in the neighbourhood |
| 33 | 1/2 octets | 0 | zero 3-class cells in the neighbourhood |
| 33 | 1/2 octets | 0 | zero 4-class cells in the neighbourhood |
| 33 | 1/2 octets | 0 | zero 5-class cells in the neighbourhood |
| 33 | 1/2 octets | 0 | zero 6-class cells in the neighbourhood |
| 33 | 1/2 octets | 5 | five 7-class cells in the neighbourhood |
| 34 | 2 octets | [cell data] | concerns the first 0-class cell |
| 34 | 2 octets | [cell data] | concerns the second 0-class cell |
| 34 | 2 octets | [cell data] | concerns the first 1-class cell |
| 34 | 2 octets | [cell data] | concerns the second 1-class cell |
| 34 | 2 octets | [cell data] | concerns the third 1-class cell |
| 34 | 2 octets | [cell data] | concerns the first 7-class cell |
| 34 | 2 octets | [cell data] | concerns the second 7-class cell |
| 34 | 2 octets | [cell data] | concerns the third 7-class cell |
| 34 | 2 octets | [cell data] | concerns the fourth 7-class cell |
| 34 | 2 octets | [cell data] | concerns the fifth 7-class cell |

With regard to extensions of the system in the future, the alternative shown in FIG. 3b and Table 2 is not as advantageous as the alternative shown in FIG. 3a and Table 1, because in 3b and 2 the fixed part of the message must be changed in to change the number of classes; the fixed part consists of the fields 33, of there are always as many as capacity classes defined in the system. For restricting the length of the message, it can be advantageous to define an upper limit such as 32, for the number of neighbouring cells described in one message.

All the neighbouring cells described in a system information message need not to the same cellular radio system as the one whose base station sends the information message. For example, the base stations of the UMTS cells can describe the nearby GSM and/or DCS1800 cells in their system information messages, whereby the dual-mode UMTS/GSM or UMTS/DCS 1800 mobile stations can utilize the cells of both systems. An arrangement like this is useful especially at the beginning of the construction of UMTS systems, when the number of cells is still small. The mobile stations which cannot operate in the cells of a certain other cellular radio system can simply ignore the descriptions concerning the cells of such systems.

It is possible to present a variation of the procedure according to FIG. 3b and Table 2, in which variation all the fields 33 are omitted, and the bits that are needed to indicate the capacity class of the cell in question are added to each cell-specific field 34. In the case of eight capacity classes, this would mean using at least three bits for this purpose in the field 34. However, the procedure according to FIG. 3b and Table 2 is regarded as more advantageous, because its computational implementation in the mobile station is easier: from the contents of the fields 33 the mobile station can directly calculate where in the message the information it is interested in is situated. In addition, in one modification the system information message contains a certain fixed number of information elements for each capacity class. However, an arrangement like this would not be very flexible in practice. The cells have a different number of neighbouring cells belonging to different capacity classes, and so it is advantageous that the proportional parts of information concerning different capacity classes can change.

Figure 4A:
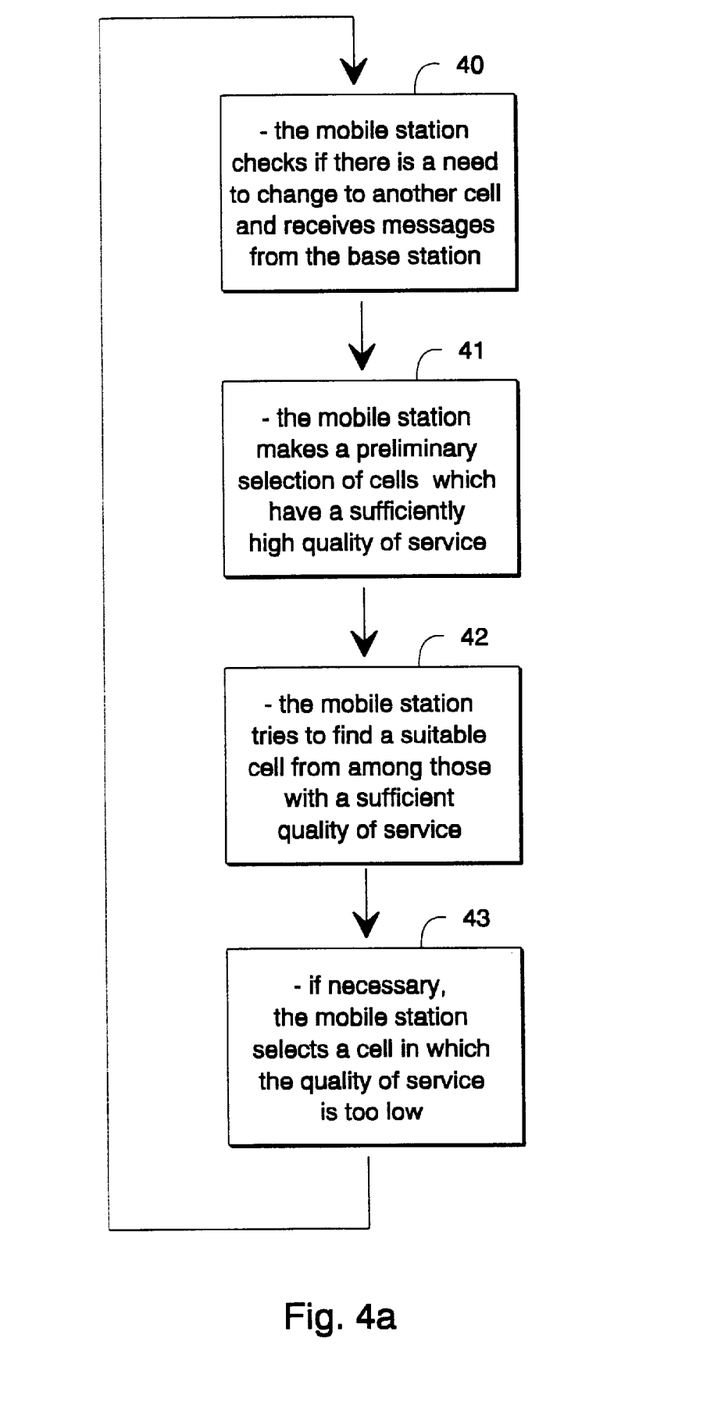
FIG. 4a shows an embodiment of the method according to the invention in a mobile station.
Figure 4B:
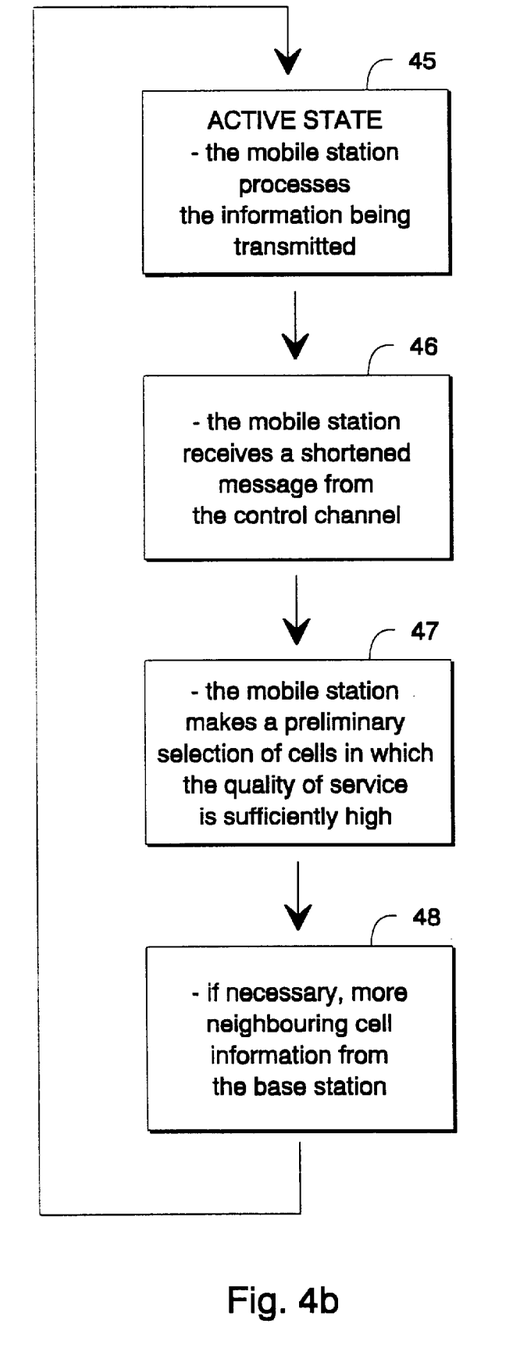
FIG. 4b shows another embodiment of the method according to the invention in a mobile station.

The following description relates to the way in which the mobile station uses the information included in the system information messages transmitted by the base stations and concerning the neighbouring cells. The purpose of using the information is that in connection with the re-selection of a cell, the mobile station can, as quickly as possible, select a new cell, which of the cells available corresponds best to the data transfer needs of the mobile station. The re-selection of a cell can take place while the mobile station is in the so-called idle mode, in which there is no active telephone or data transfer connection between the mobile station and the base station, or it can take place during an active telephone or data transfer connection. In the latter situation, the transfer of the connection from one base station to another in connection with the re-selection of a cell is called handover. By way of example, the operation of the mobile station in these alternative situations is shown in FIGS. 4a and 4b.

In the idle mode 40, the mobile station examines continuously or regularly the need to re-select a cell in a known manner by measuring the power level of the signal received from the present base station (and/or the faultlessness of a demodulated and decoded signal). According to one preferred embodiment, the mobile station can maintain a forecast based on previously realized connections on how high a data transfer speed or what kind of other quality of service will be needed in the next active connection. The formation, maintenance and utilization of the forecast has been examined more closely in the Finnish patent application FI 971927, in which the applicant is the same as in this patent application. In a simpler embodiment, the mobile station assumes that its highest possible data transfer speed will be needed in the next active connection. In any case, the mobile station receives, demodulates and decodes the system information messages transmitted by the present base station, from which it finds out, in addition to the BCCH frequencies, the quality of service offered by the neighbouring cells, such as the data transfer speed.

In step 41, the mobile station pays less attention to the neighbouring cells in which the quality of service is too low compared to the forecast formed by the mobile station or its own highest possible capacity. The discrimination of certain cells that takes place in step 41 can also be based on the attempt of the mobile station to find a neighbouring cell, which on the basis of the system information message sent by the present base station belongs to the same location area as the present base station or to the home area defined for the mobile station or to a private picocell network within which the user can operate at a lower price than the average. The invention does not limit the way the cells are discriminated in step 41, as long as it is based on the information about the neighbouring cells received by the mobile station from the present base station. Discrimination or paying less attention does not mean that according to this invention, the mobile station should entirely ignore the neighbouring cells in question, but the mobile station can save the information concerning them to wait for a possible new observation that there are no better cells available. A suitable model of operation in state 41 depends, among other things, on the density of cells of different qualities, and it can be found by simulation and testing.

In state 42, the mobile station tries to find a new cell from among those neighbouring cells which in state 41 have been found to be suitable because of their quality of service, location area or other criteria. In order that it would be advantageous for the mobile station to switch to a new cell, the new cell must fulfill the generally known suitability criteria, which in the GSM system, for instance, mean that the cell-specific C1 and C2 parameters should have sufficiently high values. The suitability criteria and other known operations for selecting a cell in the GSM system and DCS 1800 have been defined in the standards ETS 300 535 (GSM 03.22) and ETS 300 578 (GSM 05.08) of EBU (European Broadcasting Union) and ETSI (European Telecommunications Standards Institute). On a general level, the same approach can also be applied to other digital cellular radio systems. If a suitable cell is not found, the mobile station moves to search for a suitable cell in state 43 from among the cells which were given less attention in state 41. If the mobile station has time, it can search for a suitable cell from among the discriminated cells according to state 43, even if a suitable "better quality" cell had been found in state 42. By circulating continuously or regularly the loop formed by the states 40, 41, 42 and 43, the mobile station can continuously maintain a list of the best possible new cells.

In FIG. 4*b*, a mobile station in an active state 45 has less time to process information of the neighbouring cells and to make measurements, because the transmission, reception and processing of information related to an active data transfer connection take a considerable part of the time. In an active data transfer connection, there is generally at least one so-called dedicated control channel, which is used to transfer the control data between the base station and the mobile station in question. The base station can form a shortened system information message, which contains information of only those neighbouring cells which have a sufficiently high quality of service for handling a connection like the present active data transfer connection. In FIG. 4*b*, the state 46 depicts the reception of such a shortened system information message, and state 47 depicts how the mobile station focuses the measurements aimed at selecting a new cell on these cells. If a suitable new cell is not found in state 47, and the connection handled by the present base station becomes so poor that it is necessary to select a new cell, the mobile station requests in state 48 the base station to send a more extensive list, which also includes those base stations which do not have a sufficient quality of service. The purpose of this arrangement is to maintain an active data transfer connection, even with a more limited quality of service if necessary. From the user's point of view, it is probably less disturbing if the quality of the data transfer connection is temporally weakened than if it is cut off entirely. The continuous or regular repetition of the process illustrated in FIG. 4*b* ensures that the active connection always goes through the best available base station.

As an alternative for the procedure according to the states 47 and 48 as presented above, it is possible to use a procedure in which the base station lists are changed at times in the base station. Thus the base station could send information concerning different neighbouring cells in consecutive system information messages, whereby the mobile station would carry out the measurements and selections concerning the new cell on the basis of neighbouring cell information received from both the information included in the message and information described in earlier messages and saved in the memory of the mobile station. If the data transfer speed of control data between the base station and the mobile station is sufficiently high during an active telephone or data transfer connection, the base station can naturally also transmit all the same neighbouring cell information as during the idle mode of the mobile station.

The invention does not restrict the actual algorithm implementation, by which the mobile station carries out the measurements and selections concerning the new cell. However, the following points of view should be taken into account in a preferred algorithm implementation:

If the mobile station is in the idle mode, and a command given by the user or a paging message from the network indicates that the mobile station should establish an active data transfer connection which requires a higher data transfer speed or a higher quality of service than that available in the present cell, the mobile station selects a new cell. The selection of a new cell is based on the information that the mobile station has collected during the idle mode by receiving, demodulating and decoding the information about neighbouring cells included in the messages sent by the present base station and possibly by receiving, demodulating and decoding the messages sent by base stations of neighbouring cells selected on the basis of this information, which messages contain more exact cell-specific information about the communication situation, for example.

The mobile station can give less attention to certain cells mentioned in the system information message sent by the base station, if the quality of service offered by these cells is not sufficiently high for the mobile station. Measurements concerning these "discriminated" cells can be carried out later, for instance if the mobile station observes that there are no cells with a better quality of service available. Alternatively, the mobile station can measure the signal power of the "discriminated" cells as well, but receive, demodulate and decode only the messages sent by the "non-discriminated" neighbouring cells in order to get more detailed information about these cells.

The mobile station can totally ignore some neighbouring cells, for example in the case that they belong to such a different system in which the mobile station cannot operate.

The mobile station can also totally ignore some neighbouring cells if the system information messages sent by them indicate that there is a factor that the mobile station cannot utilize.

It is advantageous for the mobile station in the re-selection of a cell to favour those cells which are in the same location area as the present cell, so that the amount of internal signalling caused by the change of location area would remain as small as possible. It is also advantageous for the mobile station to favour cells which belong to its home area or other such group of cells in which the operation of the mobile station costs less for the user.

Figure 5A:
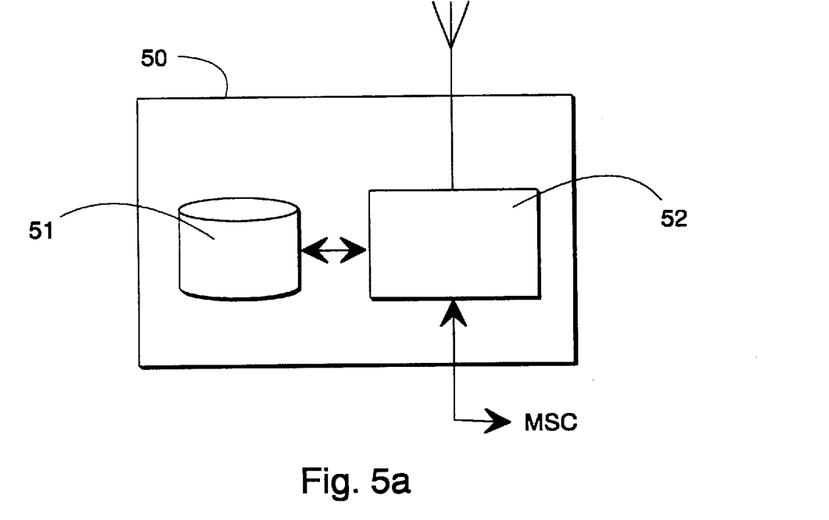
FIG. 5a shows a base station of a cellular radio system according to the invention.
Figure 5B:
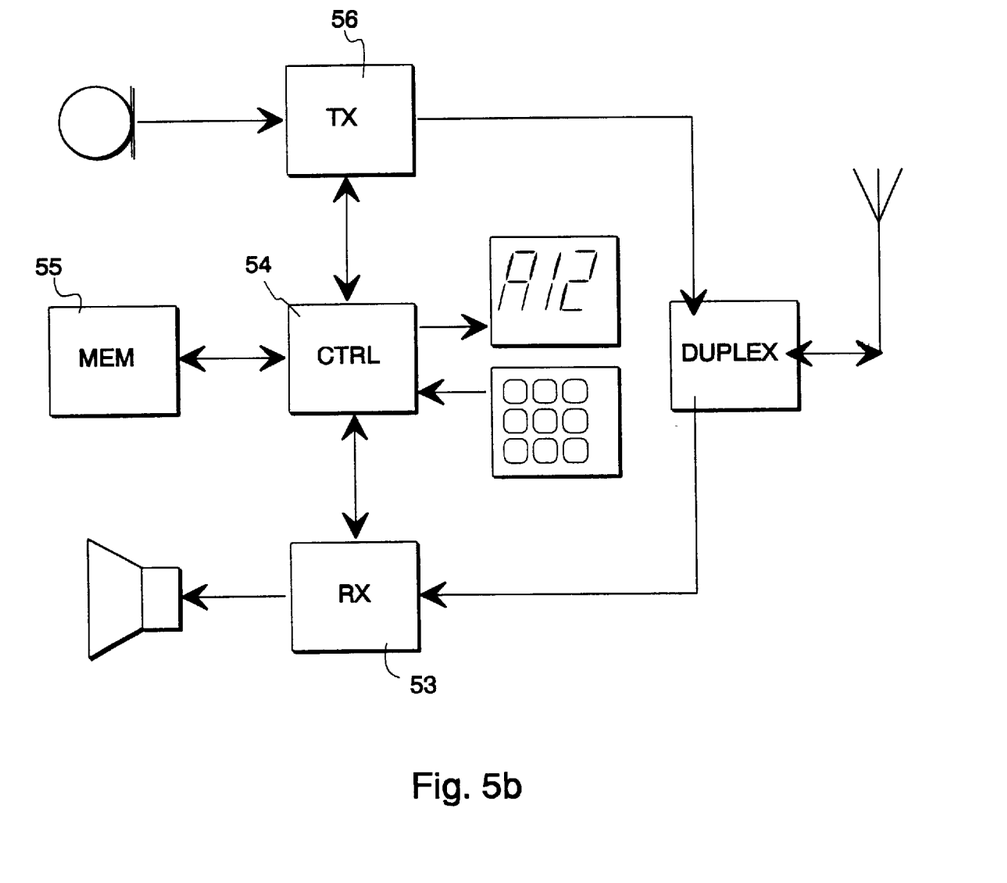
FIG. 5b shows a mobile station of a cellular radio system according to the invention.

The invention sets the base stations and mobile stations very small equipment requirements compared to the prior art. According to FIG. 5*a*, the base station 50 must have available a data base 51, which contains information about the BCCH frequencies used in the neighbouring cells and the quality of service offered by them, such as the highest possible data transfer speed. The operator normally has so-called OM facilities (Operation & Maintenance) for changing the contents of these data bases statically or permanently (for instance when a new base station starts operation near the older base stations) or dynamically (for instance when a nearby base station is run down for maintenance). The prior art base stations create and transmit many kinds of messages, and so the creation and transmission of messages concerning the information contained in the database 51 is possible with the prior art equipment 52. In the mobile station shown in FIG. 5*b*, the parts that are essential with regard to the invention include the reception block 53, through which the mobile station receives, demodulates and decodes the messages sent by the base stations and measures the power levels of received signals, and the control block 54, which processes the information contained by the messages and controls the operation of the mobile station, both as such prior art technique. Part of the memory 55 of the mobile station must be allocated to information concerning the selection of the neighbouring cell, which include information about the mobile station's own capacity and information received from the base stations about the BCCH frequencies of the neighbouring cells and the quality of service offered by them. It is naturally also possible to use a detachable storage medium, such as the known SIM card or the like for the same purpose. By means of the transmission block 56, the mobile station transmits the messages concerning the cell selection to the base stations.

The invention contributes to focusing the selection of a new cell so that the load on the mobile station caused by the measurement and reception of messages from new cells is as small as possible. The above embodiments have been presented by way of example and they do not limit the invention.

What is claimed is:

1. A method for transmitting information about neighbouring cells from the base station of a cellular radio system to a mobile station, comprising the steps of:
   at a base station of a first cell, collecting information about the transmission frequencies used in a multitude of neighbouring cells,
   at said base station of the first cell, collecting information about the quality of service offered to the mobile stations by neighbouring cells, dividing said collected quality information into predetermined quality of service classes, wherein the quality of service of each neighbouring cell is expressed by stating to which of said predetermined quality of service classes each of the neighbouring cells belongs,
   creating a message containing the collected information about the transmission frequencies and quality of service classes of neighbouring cells and
   transmitting the created message to a mobile station.

2. A method according to claim 1, wherein said message comprises
   information of how many quality of service classes there are in the cell descriptions contained in the message,
   information of the length of the part of the message that describes each quality of service class included in the message, and
   information describing each quality of service class included in the message in the order of quality of service classes.

3. A method according to claim 1, wherein said message comprises
   for each quality of service class information of how many cells belonging to the quality of service class concerned the message describes and
   information of neighbouring cells in fields of predetermined length one cell at a time.

4. A method for implementing the re-selection of a cell in a cellular radio system, which comprises base stations and cells related to them and mobile stations, comprising the steps of:
   a) transmitting from a base station to a mobile station a message, which includes information about the quality of service offered to the mobile station by a multitude of neighbouring cells near the base station, dividing said collected quality information into predetermined quality of service classes, wherein the quality of service of each neighbouring cell is expressed by stating to which of said predetermined quality of service classes each of the neighbouring cells belongs,
   b) on the basis of said message, making at the mobile station a preliminary selection of a group of the most advantageous new cells and
   c) performing at the mobile station measurements among the preliminary selection of cells in order to find a suitable new cell, whereby
      if the measurements show that there is at least one suitable, new cell among the preliminary selection of cells, the mobile station selects a new cell from this group and
      if the measurements show that there are no suitable new cells among the preliminary selection of cells, the mobile station selects the new cell from among other than those included in the preliminary selection.

5. A method according to claim 4, wherein when a certain mobile station has an active telephone or data transfer connection with a certain base station, the base station in question transmits in step a) the mobile station a message, which describes only the neighbouring cells near the base station which offer a sufficient quality of service for handling the active telephone or data transfer connection in progress.

6. A method according to claim 5, wherein in a situation in which the measurements show that there are no suitable new cells among the preliminary selection of cells, the mobile station asks said base station to transmit information about other neighbouring cells.

7. A method according to claim 4, wherein when a certain mobile station has an active telephone or data transfer connection with a certain base station, the base station in question transmits in step a) the mobile station variable messages, which describe different neighbouring cells alternatively.

8. A base station of a cellular radio system, comprising:
   means for creating messages and sending them to mobile stations,
   stored information of a group of neighbouring cells near the cell of the base station in question, including information about the transmission frequency used in said neighbouring cells and information about the quality of service offered to the mobile stations by said neighbouring cells, said quality of service information divided into predetermined quality of service classes wherein each of said neighbouring cells is classified according to said predetermined quality of service classes, and
   means for creating, on the basis of said stored information, a message describing the neighbouring cells and for transmitting said message to the mobile stations.

9. A mobile station of a cellular radio system, constructed to utilize a certain quality of service of a cell and comprising:
   means for receiving messages from base stations and for performing cell-specific measurements in order to find a suitable cell for cell re-selection,
   means for extracting information describing the cell-specific quality of service from the messages transmitted by the base station of the selected cell, said quality of service information divided into predetermined quality of service classes wherein the quality of service of each neighbouring cell is expressed by stating to which of said predetermined quality of service classes each of the neighbouring cells belongs, and means for focusing the cell-specific measurements on those of the neighbouring cells of the selected cell, which according to the information expressed correspond to the quality of service utilized by the mobile station.

10. A cellular radio system, which comprises base stations and cells related to them and mobile stations and in which the base stations comprise means for creating messages and for transmitting them to the mobile stations, and the mobile stations are arranged to expect a certain quality of service from the cell, to receive messages from base stations and to perform cell-specific measurements in order to find a suitable cell for cell re-selection, and at least one base station comprises stored information of a group of neighbouring cells near the cell of the base station in question, containing information about the transmission frequency used in said neighbouring cells and about the quality of service offered to the mobile stations by said neighbouring cells, said quality of service information divided into predetermined quality of service classes, wherein the quality of service of each of said neighbouring cells is classified according to said predetermined quality of service classes, and said base station comprises means for creating, on the basis of said information, a message describing the neighbouring cells and for transmitting said message to the mobile stations.

* * * * *